(12) United States Patent
Wochner

(10) Patent No.: US 9,725,212 B2
(45) Date of Patent: Aug. 8, 2017

(54) PACKING OF POLYSILICON

(71) Applicant: Wacker Chemie AG, Munich (DE)

(72) Inventor: Hanns Wochner, Burghausen (DE)

(73) Assignee: Wacker Chemie AG, Munich (DE)

( * ) Notice: Subject to any disclaimer, the term of this patent is extended or adjusted under 35 U.S.C. 154(b) by 32 days.

(21) Appl. No.: 14/072,277

(22) Filed: Nov. 5, 2013

(65) Prior Publication Data
US 2014/0151259 A1 Jun. 5, 2014

(30) Foreign Application Priority Data
Dec. 4, 2012 (DE) .......................... 10 2012 222 249

(51) Int. Cl.
| | |
|---|---|
| *B65B 3/04* | (2006.01) |
| *B65B 3/28* | (2006.01) |
| *B65D 33/00* | (2006.01) |
| *B29C 65/38* | (2006.01) |
| *B29C 65/00* | (2006.01) |
| *B65D 75/38* | (2006.01) |
| *B65D 75/52* | (2006.01) |
| *B65D 81/00* | (2006.01) |
| *B29C 65/22* | (2006.01) |
| *B29C 65/74* | (2006.01) |

(52) U.S. Cl.
CPC ............ *B65D 33/00* (2013.01); *B29C 65/222* (2013.01); *B29C 65/38* (2013.01); *B29C 66/43121* (2013.01); *B29C 66/71* (2013.01); *B29C 66/929* (2013.01); *B29C 66/9241* (2013.01); *B65B 3/04* (2013.01); *B65D 75/38* (2013.01); *B65D 75/52* (2013.01); *B65D 81/00* (2013.01); *B29C 65/7433* (2013.01); *B29C 66/1122* (2013.01); *B29C 66/723* (2013.01); *B29C 66/8122* (2013.01)

(58) Field of Classification Search
CPC .......... B65B 3/04; B65D 33/00; B65D 75/38; B65D 75/52; B65D 81/00; B29C 66/929; B29C 66/71; B29C 66/8122; B29C 65/222; B29C 65/38; B29C 65/7433; B29C 66/1122; B29C 66/43121; B29C 66/723; B29C 66/9241; B29K 2023/06; B29K 2023/0625; B29K 2023/0633; B29K 2023/065; B29K 2827/18
USPC .......................... 428/35.7; 206/524.1; 53/469
See application file for complete search history.

(56) References Cited

U.S. PATENT DOCUMENTS

| | | | |
|---|---|---|---|
| 3,480,505 A * | 11/1969 | Calvert et al. ................. | 156/498 |
| 4,565,720 A | 1/1986 | Yaeo et al. | |
| 4,586,624 A * | 5/1986 | Shaw .................... | B29C 65/342 |
| | | | 156/273.9 |
| 4,901,506 A * | 2/1990 | Weyandt ................ | B29C 65/18 |
| | | | 219/110 |
| 4,944,973 A | 7/1990 | Follette | |
| 5,561,964 A | 10/1996 | McIntyre et al. | |
| 2005/0034430 A1 | 2/2005 | Holzlwimmer et al. | |
| 2006/0088970 A1 | 4/2006 | Hesse et al. | |
| 2006/0257055 A1 | 11/2006 | Oberdorf et al. | |
| 2010/0154357 A1 | 6/2010 | Wochner et al. | |
| 2012/0198793 A1 | 8/2012 | Vietz et al. | |
| 2013/0236767 A1 | 9/2013 | Nishikawa et al. | |

FOREIGN PATENT DOCUMENTS

| | | |
|---|---|---|
| CN | 102633002 A | 8/2012 |
| DE | 3640520 A1 | 6/1988 |
| DE | 102007027110 A1 | 12/2008 |
| EP | 1334907 A1 | 8/2003 |
| EP | 1645333 A1 | 4/2006 |
| JP | 2641930 | 8/1989 |
| JP | 2002240862 | 8/2002 |
| JP | 2004223728 | 8/2004 |
| JP | 2006176620 | 7/2006 |
| JP | 2012101838 * | 5/2012 |
| JP | 2012101838 A | 5/2012 |
| WO | 9823434 A1 | 6/1998 |
| WO | 2005047135 A1 | 5/2005 |
| WO | 2012/060231 A1 | 5/2012 |

OTHER PUBLICATIONS

PatBase abstract for JP 2012-101838 A2.
PatBase abstract for DE 3640520.
English abstract for JP56023452 A2 (1981).
Hishinuma, Kazuo, "Optimization of Heat Method for the Heat Sealing", Partial English Translation, The University of Tokyo Thesis (No. 16508), May 1, 2006, 31 pages.

* cited by examiner

*Primary Examiner* — Yan Lan
(74) *Attorney, Agent, or Firm* — Caesar Rivise, PC

(57) ABSTRACT

A bag contains polysilicon, has been welded and includes at least one weld seam and a polyethylene film having: a thickness of 150-900 μm; a stiffness at a flexural modulus $F_{max}$ of 300-2000 mN and $F_t$ of 100-1300 mN; a fracture force F determined by dynamic penetration testing of 200-1500 N; a fracture energy Ws of 2-30 J; a penetration energy $W_{tot}$ of 2.2-30 J; a film tensile stress at 15% longitudinal and transverse elongation of 9-50 MPa; an Elmendorf longitudinal film tear resistance of 10-60 cN; an Elmendorf transverse film tear resistance of 18-60 cN; a longitudinal film elongation at break of 300-2000%; a transverse film elongation at break of 450-3000%; and a weld seam strength of 25-150 N/15 mm. A method includes filling a bag with polysilicon, and welding by pulse sealing with contact pressure greater than 0.01 N/mm² to obtain a 25-150 N/15 mm weld seam strength.

11 Claims, No Drawings

PACKING OF POLYSILICON

BACKGROUND OF THE INVENTION

The invention relates to the packing of polysilicon, especially of chunk polycrystalline silicon (chunk polysilicon).

Polysilicon is deposited from trichlorosilane by means of the Siemens process, for example, and then comminuted, ideally without contamination. A method for automatic crushing and a corresponding apparatus are described in EP 1 645 333 A1.

For applications in the semiconductor and solar industries, chunk polysilicon with minimum contamination is desired. Therefore, the material should also be packed with low contamination before being transported to the customer.

Typically, chunk polysilicon for the electronics industry is packed in 5 kg bags with a weight tolerance of +/−F 50 g. For the solar industry, chunk polysilicon in bags containing a weight of 10 kg with a weight tolerance of +/−max. 100 g are customary.

Tubular bag machines suitable in principle for packing chunk silicon are commercially available. A corresponding packing machine is described, for example, in DE 36 40 520 A1.

Chunk polysilicon is a sharp-edged, non-free-flowing bulk material having a weight of the individual Si chunks of up to 2500 g. Therefore, in the course of packing, it has to be ensured that the material does not penetrate the customary plastic bags in the course of filling, or in the worst case even completely destroy them. In order to prevent this, the commercial packing machines have to be suitably modified for the purpose of packing polysilicon.

With commercial packing machines, it is generally impossible to comply with the purity demands which are made on chunk polysilicon, since the composite films typically used, because of the chemical additions, can lead to increased contamination of the chunk polysilicon.

From EP 1 334 907 B1 is an apparatus for the cost-effective, fully automatic transporting, weighing, portioning, filling and packing of high-purity polysilicon fragments, comprising a conveyor channel for the polysilicon fragments, a weighing device of the polysilicon fragments, which is connected to a hopper, deflection plates made from silicon, a filling device, which forms a plastic bag from a highly pure plastic film, comprising a deionizer which prevents static charging and therefore contamination of the plastic film with particles, a welding device for the plastic bag filled with polysilicon fragments, a flowbox which is fitted above the conveyor channel, weighing device, filling device and welding device, and which prevents contamination of the polysilicon fragments by particles, a conveyor belt having a magnetically inductive detector for the welded plastic bag filled with polysilicon fragments, wherein all the components which come into contact with the polysilicon fragments are sheathed with silicon or clad with a highly wear-resistant plastic.

DE 10 2007 027 110 A1 describes a method for packaging polycrystalline silicon, comprising filling polycrystalline silicon by a filling device into a freely suspended, completely formed bag, and then closing the bag thus filled, wherein the bag consists of high-purity plastic with a wall thickness of from 10 to 1000 µm. Preferably, the closed plastic bag filled with polycrystalline silicon is introduced into a further plastic bag of PE with a wall thickness of from 10 to 1000 µm, and this second plastic bag is closed. Here, the first bag is thus inserted into a second bag (double bag).

In principle, there are two forms of bags, namely flat bags and free-standing bags.

Tubular films can be obtained by means of an extruder. Extruders are known as conveying units which, according to the principle of function of the screw conveyor, express solid to viscous and extrudable materials under high pressure and high temperature homogeneously out of a shaping orifice. This process is referred to as extrusion. Thermoplastic polymers such as PVC, PE, PP are known as extrudable materials.

Bags can be manufactured from the tubular films thus obtained, by sealing and subsequent division from the tubular film. Such bags are also commercially available in ready-made form.

Experience has shown that bags made from commercial PE films having undefined properties, which are filled with chunk polysilicon, are damaged in the course of transport. The sharp-edged chunk silicon causes damage, for example in the form of penetration and torn-open weld seams.

This problem gave rise to the objective of the invention.

DESCRIPTION OF THE INVENTION

The object of the invention is achieved by a bag which contains polysilicon and has been welded and includes at least one weld seam, formed from a PE film having a thickness of 150-900 µm having a stiffness at the flexural modulus $F_{max}$ of 300-2000 mN and $F_t$ of 100-1300 mN, having a fracture force F determined by dynamic penetration testing of 200-1500 N, a fracture energy Ws of 2-30 J and a penetration energy $W_{tot}$ of 2.2-30 J, with a film tensile stress at 15% longitudinal and transverse elongation of 9-50 MPa, with an Elmendorf longitudinal film tear resistance of 10-60 cN and an Elmendorf transverse film tear resistance of 18-60 cN, with a longitudinal film elongation at break of 300-2000%, with a transverse film elongation at break of 450-3000%, and with a weld seam strength: 25-150 N/15 mm.

The invention is also solved by a method for packing polysilicon into a plastic bag by filling the bag with polysilicon and welding the bag, which comprises effecting the welding by pulse sealing with a contact pressure by means of welding jaws greater than 0.01 N/mm², resulting in a weld seam having a weld seam strength of 25-150 N/15 mm. Polysilicon preferably comprises chunks of polysilicon as present after deposition of polysilicon in a Siemens reactor and subsequent comminution of the polysilicon rods deposited. If appropriate, the chunks have been subjected to a chemical cleaning operation before packing, in order to free the surface of the chunks, for example, from metal contamination.

The polysilicon may also comprise rods or rod pieces. Rod pieces are obtained by dividing (for example sawing) a polysilicon rod deposited in a Siemens reactor. However, the problem of transport damage to bags with rods or rod pieces is less marked than in the case of sharp-edged chunks.

Preferably, the bag is produced by means of an extruder from a tubular PE film and sealed. Preferably, the bag is sealed before the filling of the bag with polysilicon by means of pulse sealing.

Preference is given to temperature-regulated pulse sealing. In this case, in each sealing operation, the sealing temperature is regulated in order to ensure reproducible sealing results and a homogeneous sealing quality, especially in prolonged operation with high frequency. The sealing temperature in every sealing operation is detected without a sensor through electrical resistance measurement of the seal wire, and regulated accordingly.

The sealing gives the bag lateral seal seams.

In the production of a tubular bag, a shaping tube or a shaping shoulder is used. In this case, the film is shaped to a tube in running direction using a shaping shoulder. According to the bag shape desired, round or angular size tubes may be used. According to the film material used, the longitudinal seal seam may be executed either as a protruding seal seam or as a flat seal seam. The horizontal bottom and top seal seams of the tubular bag are made in a horizontal sealing station in which an apparatus for division or cutting of the tubular bag is also integrated. The longitudinal seal seams are preferably generated by means of transverse jaws movable with respect to one another.

In the case of production of a flat bag, the insides of the film material are placed one on top of the other, and the film material receives its shape and the desired dimensions through the sealing. The seal may be executed as a three-edge seal or as a four-edge seal with an additional seal seam on the underside.

For the production and the filling of the bags, horizontal bag machines or vertical tubular bag machines can be used.

The welding of the polysilicon-filled PE bag is preferably effected with a heat-sealing welding device in which the metallic weld wire is sheathed with a nonmetallic material, for example polytetrafluoroethylene (PTFE).

The welding in the course of production of the bags and after the filling with chunk poly can be effected by time-controlled pulse sealing or time-controlled temperature-regulated pulse sealing.

If two weld wires (weld wire and separation wire) are used, the excess film residue can be removed.

The parameters in the extruder should be adjusted such that the opening of the bags which are produced from the tubular film by processing is not complicated by blocking. This is more particularly the cooling of the tube after it leaves the extruder.

In order to achieve a scatter breadth of the weld seam strength of +/−15%, time-controlled pulse sealing is insufficient. In this case, time-controlled temperature-regulated pulse sealing is necessary.

The contact pressure onto the weld site by the welding jaws must be greater than 0.01 $N/mm^2$.

Excessively blocked bags can be so difficult to open prior to filling that the productivity falls significantly.

Preferably, prior to the welding, the air is sucked out of the bag until a flat bag containing little air arises.

Before packing, the polysilicon is first portioned and weighed. The portioning and weighing of the chunk polysilicon is effected by means of an inventive metering unit.

The inner bag ideally consists of a polymer film having a thickness of 100-500 μm.

The polymer used is preferably a monofilm of PE-LD, PE-LLD or PE-HD. The use of multilayer films from blown film extrusion or casting processes is likewise possible.

The inner bag is provided with a single, double or triple weld seam at the top, bottom and at the longitudinal seal.

The wear-resistant coating of the shaper prevents contamination of the inside of the bag.

In order to pack silicon in two bags as usual, a second packing unit is required.

According to the invention, the packing with the second bag is effected in an abovementioned packing unit, but now with horizontal setup.

The second plastic bag is shaped, while a first, already closed plastic bag containing polysilicon is introduced horizontally into the second plastic bag by means of a conveying channel or other suitable transport units. Subsequently, the second plastic bag is closed.

The horizontal packing can prevent abrasion and penetration by larger silicon chunks, as often observed in the case of vertical packing machines.

By means of tubular preformers or air injection or film spreaders or—more preferably—through the combination thereof, fold-free shaping of the bag is achieved.

In place of the film spreaders, it is also possible to use actuated plastic wheels or metal clips.

The shaped and longitudinally sealed and horizontally arranged tubular film is preferably pressed flat by means of shaping tubes arranged at the bottom and top.

After filling of the plastic bag, it is preferably welded by means of two shaping jaws.

The closure device/closure station is preferably a welding apparatus, more preferably a heat-sealing welding device based on a heated weld wire which is preferably sheathed with a nonmetallic material, for example polytetrafluoroethylene (PTFE).

It has been found that, without the aforementioned measures, fold-free transverse sealing is not possible in the case of large silicon chunks (50-130 mm).

Alternatively, a fold-free weld seam can also be achieved by lowering the transport belt or the transport unit downstream of a transverse welding jaw.

For this purpose, shortly before closure of the transverse welding jaw, the conveyor belt has to be lowered to such an extent that the inner bag can slide within the outer bag as far as the weld seam already produced.

As a result of this, the tubular film is pulled over the edge of the welding jaw and a fold-free weld seam arises.

In addition, the outer bag, by virtue of the defined position of the inner bag, may also become shorter than in the variant described above.

The outer bag preferably likewise consists of one of the abovementioned polymer films from flat sheet manufacture.

This polymer film is shaped by means of the secondary packing machine and likewise sealed with a single, double or triple weld seam. A grip hole can also be punched through the weld seam for easier removal from the packing machine.

The packing machine may also be equipped with automatic regulation or coincident alignment of the film for a symmetrical fin seam.

A product label can be applied to the inner bag and to the outer bag.

This label may be printed with barcode or data matrix code.

The use of RFID labels is likewise possible.

The outer bag can be welded in a fold-free manner, which increases operational reliability.

The stiffness at the flexural modulus is determined to DIN 53121. Flexural modulus refers to the ratio of the maximum fiber stress to the maximum strain within the elasticity limit in a stress-strain diagram which has been obtained in a bending test. An alternative term is the flexural modulus of elasticity. Stiffness is a measure of the bending resistance of plastics. It encompasses both the plastic and elastic characteristics and is thus more of an apparent value for the modulus of elasticity than a true value. (ASTM D-747)

Dynamic penetration testing is effected to DIN 53373. Testing of plastic films; impact penetration test with electronic data recording.

The determination of the film tear strengths and of the film elongation at break is effected to DIN EN ISO—527-3: Plastics—determination of tensile properties.

The determination of the film tensile stress at 15% elongation is effected to DIN EN ISO—527-3.

The determination of the film tear resistance is effected according to Elmendorf (DIN EN 21974). Tear propagation and rupture characteristics of films, rupture resistance Elmendorf are determined according to ASTM D 1922/DIN EN ISO 6383-2

The weld seam strength is determined to DIN 55543-3, Determination of the strength of longitudinal seams of sacks and bags.

EXAMPLES

Comparative Example 1

Packing in a Flat PE Bag with the Following Film Properties:
Thickness of the film: 100 μm
Stiffness at the flexural modulus: $F_{max}$=100 mN; $F_t$=50 mN
Dynamic penetration testing:
Fracture force F=100 N
Fracture energy Ws=1 J
Penetration energy $W_{tot}$=1 J
Longitudinal film tensile stress at 15% elongation=6 MPa
Transverse film tensile stress at 15% elongation=5 MPa
Elmendorf longitudinal film tear resistance=5 cN
Elmendorf transverse film tear resistance=5 cN
Longitudinal film elongation at break: =100 percent
Transverse film elongation at break: =150 percent This PE film was used to produce 60 PE bags which were filled with 5 kg of chunk poly with chunk size 4 having an edge length of from 60 to 150 mm.

The welding was effected by time-controlled temperature-regulated pulse sealing:
Temperature: 200 degrees
Sealing time: 2 seconds
Contact pressure through the welding jaws: 0.01 N/mm²
Mean weld seam strength: =20 N/15 mm 6 bags each were introduced into one cardboard box. The 10 cardboard boxes were driven for 2000 km through Germany on a truck.

After transport, the bags were checked visually for damaged weld seams and, with the aid of the water dip method, for punctures.

The water dip method involves dipping the air-filled, emptied bag into a water-filled basin. Leaks in the PE bag are recognized immediately by ascending gas bubbles.

20% of the weld seams came open during transport.
50% of the bags were no longer leakproof after transport.

Example 1

Packing into a Flat PE Bag Having the Following Film Properties:
Thickness of the film: 300 μm
Stiffness at the flexural modulus: $F_{max}$=500 mN; $F_t$=200 mN
Dynamic penetration testing:
Fracture force F=300 N
Fracture energy Ws=4 J
Penetration energy $W_{tot}$=4.5 J
Longitudinal film tensile stress at 15% elongation=12 MPa
Transverse film tensile stress at 15% elongation=13 MPa
Elmendorf longitudinal film tear resistance=15 cN
Elmendorf transverse film tear resistance=25 cN
Longitudinal film elongation at break: =500 percent
Transverse film elongation at break: =700 percent This PE film was used to produce 60 PE bags which were filled with 5 kg of chunk poly with chunk size 4 having an edge length of 60 to 150 mm.

The welding was effected by time-controlled temperature-regulated pulse sealing:
Temperature: 240 degrees
Sealing time: 4 seconds
Contact pressure through the welding jaws: 0.02 N/mm²
Mean weld seam strength: =45 N/15 mm The weld seam strength for the 60 PE bags has a scatter of +/−15% with respect to the mean.

6 bags each were introduced into one cardboard box. The 10 cardboard boxes were driven for 2000 km through Germany on a truck.

After transport, the bags were checked visually for damaged weld seams and, with the aid of the water dip method, for punctures.

0% of the weld seams came open during transport.
0% of the bags were no longer leakproof after transport.

Example 2

Packing into a Flat PE Bag Having the Following Film Properties:
Thickness of the film: 300 μm
Stiffness at the flexural modulus: $F_{max}$=500 mN; $F_t$=200 mN
Dynamic penetration testing:
Fracture force F=300 N
Fracture energy Ws=4 J
Penetration energy $W_{tot}$=4.5 J
Longitudinal film tensile stress at 15% elongation=12 MPa
Transverse film tensile stress at 15% elongation=13 MPa
Elmendorf longitudinal film tear resistance=15 cN
Elmendorf transverse film tear resistance=25 cN
Longitudinal film elongation at break: =500 percent
Transverse film elongation at break: =700 percent This PE film was used to produce 60 PE bags which were filled with 5 kg of chunk poly with chunk size 4 having an edge length of 60 to 150 mm.

The welding was effected by time-controlled pulse sealing without temperature regulation:
Sealing time: 4 seconds
Contact pressure through the welding jaws: 0.02 N/mm²
Weld seam strength: =45 N/15 mm The weld seam strength for the 60 PE bags has a scatter of +/−30% with respect to the mean.

6 bags each were introduced into one cardboard box. The 10 cardboard boxes were driven for 2000 km through Germany on a truck.

After transport, the bags were checked visually for damaged weld seams and, with the aid of the water dip method, for punctures.

5% of the weld seams came open during transport.
25% of the bags were no longer leakproof after transport.

Examples 1 and 2 show a distinct improvement over the comparative example. These improvements are attributable to the altered properties of the film and to the altered weld seam strength.

Example 1 shows the advantages of temperature-regulated pulse sealing. This makes it possible to provide bags of chunk polysilicon which show no leaks or breaking-open of the weld seam whatsoever after transport.

What is claimed is:

1. A method for packing polysilicon into a plastic bag from a PE film with a thickness of 150-900 µm, a stiffness at a flexural modulus $F_{max}$ of 300-2000 mN and $F_t$ of 100-1300 mN, having a fracture force F determined by dynamic penetration testing of 200-1500 N, a fracture energy $W_s$ of 2-30 J and a penetration energy $W_{tot}$ of 2.2-30 J, having a film tensile stress at 15% longitudinal and transverse elongation of 9-50 MPa, having an Elmendorf longitudinal film tear resistance of 10-60 cN and an Elmendorf transverse film tear resistance of 18-60 cN, having a longitudinal film elongation at break of 300-2000% and having a transverse film elongation at break of 450-3000, and is produced by means of an extruder from a tubular PE film, comprising production of the bag, sealing the PE film prior to filling the bag, filling the bag with polysilicon and welding the bag after filling the bag, wherein the sealing and welding steps are effected by time-controlled, temperature regulated pulse sealing with a contact pressure by means of welding jaws greater than 0.01 N/mm², resulting in a weld seam having a weld seam strength of 25-150 N/15 mm, wherein in each sealing and welding operation, the sealing and welding temperatures are detected without a sensor through electrical resistance measurement of a metallic seal wire that is sheathed in a nonmetallic material and regulated, in order to ensure reproducible sealing results and a homogeneous sealing quality, especially in prolonged operation with high frequency.

2. The method of claim 1, wherein prior to the welding, air is sucked out of the bag until a flat bag containing little air arises.

3. The method of claim 2, wherein before packing, the polysilicon is first portioned and weighed.

4. The method of claim 3, comprising fold-free shaping of a second plastic bag from a PE film by means of tubular preforms or air injection or film spreaders or through a combination thereof, and introducing a first already closed polysilicon-filled PE bag horizontally into the second plastic bag by means of a conveying channel or other suitable transport units and welding of the second plastic bag by means of two welding jaws.

5. The method of claim 1, wherein before packing, the polysilicon is first portioned and weighed.

6. The method of claim 5, comprising fold-free shaping of a second plastic bag from a PE film by means of tubular preforms or air injection or film spreaders or through a combination thereof, and introducing a first already closed polysilicon-filled PE bag horizontally into the second plastic bag by means of a conveying channel or other suitable transport units and welding of the second plastic bag by means of two welding jaws.

7. The method of claim 6, comprising introducing a first already closed polysilicon-filled PE bag horizontally into a second plastic bag of tubular PE film by means of a conveying channel or other suitable transport units and welding of the second plastic bag by means of two welding jaws, wherein the conveying channel or the transport unit is lowered to such an extent that the first bag can slide within the second plastic bag as far as the weld seam already produced so that the tubular film is pulled over the edge of the welding jaw and a fold-free weld seam arises.

8. The method of claim 1, comprising fold-free shaping of a second plastic bag from a PE film by means of tubular preforms or air injection or film spreaders or through a combination thereof, and introducing a first already closed polysilicon-filled PE bag horizontally into the second plastic bag by means of a conveying channel or other suitable transport units and welding of the second plastic bag by means of two welding jaws.

9. The method of claim 8, comprising introducing a first already closed polysilicon-filled PE bag horizontally into a second plastic bag of tubular PE film by means of a conveying channel or other suitable transport units and welding of the second plastic bag by means of two welding jaws, wherein the conveying channel or the transport unit is lowered to such an extent that the first bag can slide within the second plastic bag as far as the weld seam already produced so that the tubular film is pulled over the edge of the welding jaw and a fold-free weld seam arises.

10. The method of claim 1, comprising introducing a first already closed polysilicon-filled PE bag horizontally into a second plastic bag of tubular PE film by means of a conveying channel or other suitable transport units and welding of the second plastic bag by means of two welding jaws, wherein the conveying channel or the transport unit is lowered to such an extent that the first bag can slide within the second plastic bag as far as the weld seam already produced so that the tubular film is pulled over the edge of the welding jaw and a fold-free weld seam arises.

11. The method of claim 1, wherein prior to the welding, air is sucked out of the bag until a flat bag containing little air arises.

\* \* \* \* \*